US005369685A

United States Patent [19]
Kero

[11] Patent Number: 5,369,685
[45] Date of Patent: Nov. 29, 1994

[54] VOICE-ACTIVATED TELEPHONE DIRECTORY AND CALL PLACEMENT SYSTEM

[75] Inventor: Terrence E. F. Kero, Pacifica, Calif.

[73] Assignee: Sprint Communications Company L.P., Westwood, Kans.

[21] Appl. No.: 666,155

[22] Filed: Mar. 7, 1991

[51] Int. Cl.$^5$ .............................................. H04M 1/64
[52] U.S. Cl. ...................................... 379/67; 379/88; 379/355
[58] Field of Search ................... 379/67, 88, 354, 355, 379/357; 381/40, 41, 42, 43

[56] References Cited

U.S. PATENT DOCUMENTS

| | | | |
|---|---|---|---|
| 4,581,486 | 4/1986 | Matthews et al. | 379/69 |
| 4,593,157 | 6/1986 | Usdan | 379/354 |
| 4,709,387 | 11/1987 | Masuda | 379/355 |
| 4,763,350 | 8/1988 | Immendorfer et al. | 379/67 |
| 4,853,953 | 8/1989 | Fujisaki | 379/355 |
| 4,864,622 | 9/1989 | Iida et al. | 379/42 |
| 4,899,377 | 2/1990 | Bauer et al. | 379/354 |
| 4,928,302 | 5/1990 | Kanechi et al. | 379/88 |
| 5,007,081 | 4/1991 | Schmuckal et al. | 379/354 |

FOREIGN PATENT DOCUMENTS

0023266  1/1987  Japan .................................... 379/59

OTHER PUBLICATIONS

"Voice Dialer", M. Immendörfer, Electrical Communication (ITT) vol. 59, No. 3, 6 May 1985.
"Voice Activated Telephone", Masanori Miyatake et al., pp. 468–473, IEEE Transaction on Consumer Electronics, vol. CE-32, No. 3, Aug. 86.
"Dial-Free Phone", Telecommunications, Sep. 86.

Primary Examiner—Curtis Kuntz
Assistant Examiner—Huyen D. Le
Attorney, Agent, or Firm—Harley R. Ball; Michael J. Setter

[57] ABSTRACT

A voice activated telephone directory and call placement system accessible over a telecommunications network allows a caller to store a personalized telephone directory, and to retrieve a selected directory listing therefrom by speaking a series of voice entries. In response, the system selectively provides a voice rendition of a destination telephone number associated with the listing and optionally initiates dialing of the number.

10 Claims, 10 Drawing Sheets

VOICE-ACTIVATED TELEPHONE DIRECTORY AND CALL PLACEMENT SYSTEM

BACKGROUND OF THE INVENTION

1. Field of the Invention

The present invention relates to the field of telecommunications. More particularly, the invention hereof concerns a voice-activated telephone directory and call placement system accessible over the telecommunications network which allows a caller to store a personalized telephone directory, and to retrieve a selected directory listing therefrom by speaking a series of voice entries. In response, the system selectively provides a voice rendition of a destination telephone number associated with the listing and optionally initiates dialing of the number.

2. Description of the Prior Art

In prior art, voice-activated, telephone directory systems, a number of voice templates are stored corresponding to respective directory listings from which an associated destination telephone number can be identified and retrieved. Examples of such prior art systems are disclosed in U.S. Pat. Nos. 4,928,302, 4,797,929 and Re.32,012 which are hereby incorporated by reference.

These prior art systems present problems, however, when handling a large number of stored directory listings and corresponding voice templates. For example, the time required to compare a caller-spoken entry with directory listing templates increases with the number of stored listings. Because of this, the storage of a sufficient number of directory listings to be genuinely useful to the caller results in excessive processing time. Additionally, the likelihood of errors also increases with the number of stored listings which further detracts from system utility.

SUMMARY OF THE INVENTION

The voice-activated telephone directory and call placement system of the present invention provides a distinct advance in the state of the art and solves the prior art problems discussed above. More particularly, the system hereof allows a caller to create a personalized, voice-activated telephone directory having a large number of directory listings while providing for rapid, substantially error-free retrieval of listings and associated destination telephone numbers.

Broadly speaking, the preferred system compares a caller-spoken entry received over a telecommunications network with a previously stored voice template of the caller speaking the name of a subdirectory which is included as part of the caller's personalized telephone directory. If a match is determined between the entry and subdirectory name template, a subsequent caller-spoken entry received over the network is compared to a voice template of the caller speaking a directory listing, included as part of the subdirectory. The system then retrieves the destination telephone number associated with the directory listing if a match is determined between the spoken entry and the listing template.

In preferred forms, a number of subdirectories are provided such as business, personal and company with each subdirectory including subordinate levels of subsidiary directories, and with each subsidiary directory including a plurality of listings. Preferably, the lowest level subsidiary directories correspond to letters of the alphabet with the first letter of the listings included therein corresponding to the respective letter.

In use, a caller wishing to use a personalized directory dials an assigned number, and speaks a predetermined passcode. Upon verifying the identity of the caller through comparison with a previously stored passcode template, the system retrieves the caller's directory and prompts the caller to speak the name of the desired subdirectory. If a match is determined with the stored template, the caller is sequentially prompted to speak the names of subsidiary directories, and finally the desired listing. The system is then prompted upon entry of the appropriate spoken command to initiate dialing of the associated destination telephone number or to provide a voice rendition of the number to the caller.

DETAILED DESCRIPTION OF THE PREFERRED EMBODIMENT

Figure 1:
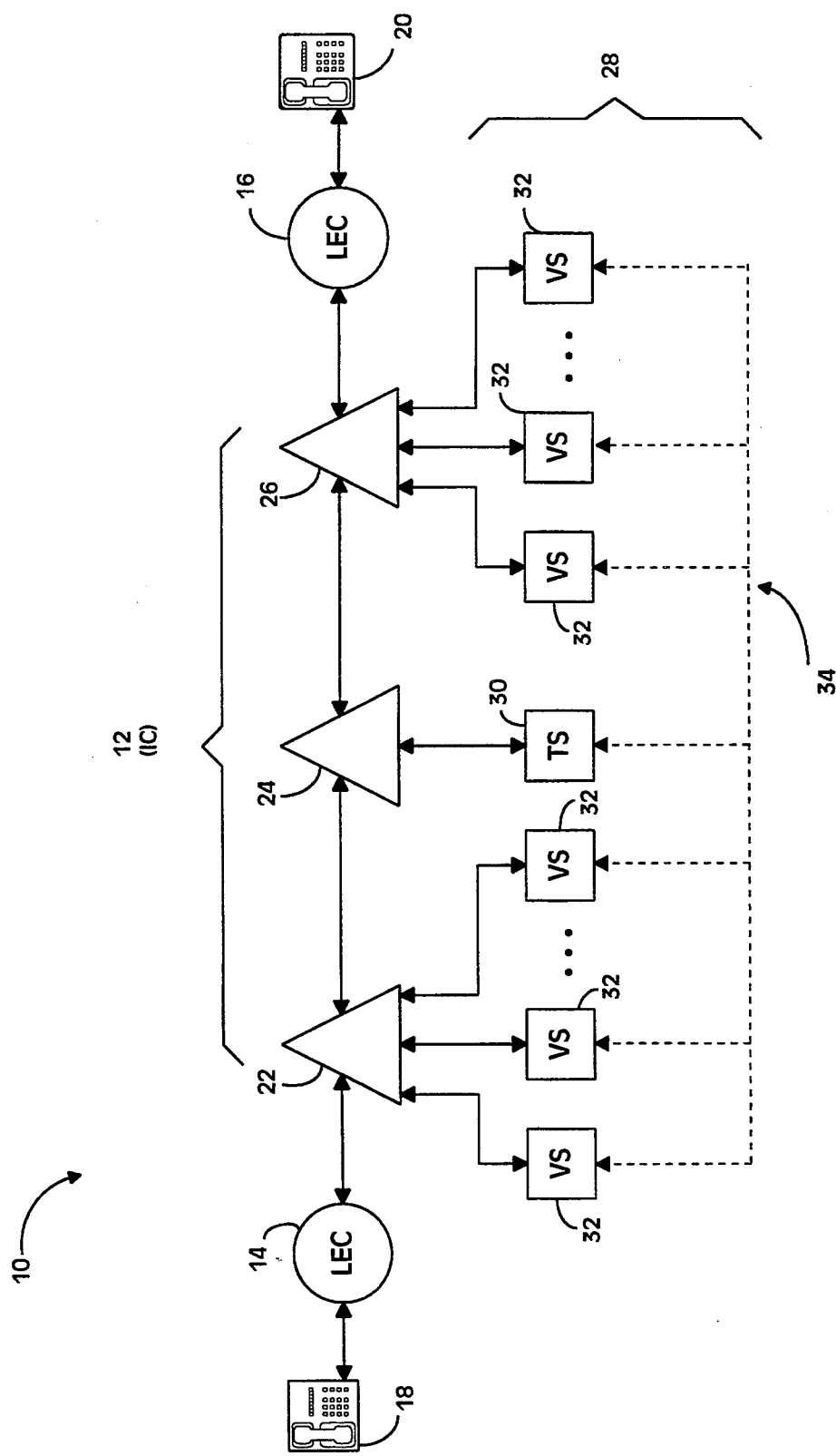
FIG. 1 is a schematic representation of a telecommunications network including calling stations, local exchange carriers(LEC), and an interexchange carrier(IC) network, also illustrating connection with voice responsive equipment.

FIG. 1 is a schematic representation of a telecommunications network 10 illustrating an interexchange carrier (IC) network 12 connected to respective local exchange carriers (LEC) 14 and 16 which are, in turn, connected to respective calling stations 18 and 20. Network 12 includes a plurality of switches 22, 24 and 26, and voice responsive control devices 28 connected to the network at switches 22-26.

As those skilled in the art will appreciate, IC network 12 carries long-distance communications traffic including voice and data between local exchange carriers or between local access transport areas(LATA's). The local telephone company provide "plain old telephone service" (POTS) to individual customers at calling stations represented by stations 18 and 20.

Voice responsive control devices 28 are operable for storing retrievable voice templates, to receive and store spoken utterances, to decode, that is, recognize selected spoken words and digits independently of the speaker thereof, and to compare the stored utterances with selectively retrieved voice templates to determine whether they match. Such devices are well known to those skilled in the art such as that disclosed in *AT&T Technical Journal,* September/October, 1986, Vol. 65, No. 5 known as the CONVERSANT I voice system available from AT&T, or that disclosed in the article entitled "Using Cepstral Features In Speech Verification" published in *SPEECH TECH* '86, pages 287–290, both of which are incorporated herein by reference.

Preferred control device 28 is provided by Texas Instruments, Inc. of Dallas, Tex. and includes template storage (TS) unit 30 connected to switch 24, and a plurality of voice servers (VS) 32 connected to switches 22,26. Template storage unit 30 is operable to store digitally encoded, voice templates of spoken utterances of assigned passcodes which may include passwords, identification numbers, or alphanumeric combinations. Unit 30 is also operable to store voice templates of other spoken utterances which preferably include subdirectory and subsidiary names, directory listings, and other commands as explained further hereinbelow.

In the preferred embodiment, a plurality of voice servers 32 are connected to selected switches 22,26 as needed, with each server 32 operable to handle a plurality of calls. The number of voice servers and the respective connections to switches 22,26 depend upon the anticipated usage level of directory system of the present invention. Each switch is programmed to respond to the dialing of one or more assigned toll-free access numbers by placing the station from which a call originates into communication with one of the voice servers 32 in order to provide the caller with access to the caller's personalized telephone directory. In addition, each switch is configured to "hunt" for an idle voice server and to transmit the dialed access number to the selected voice server 32.

Template storage unit 30 stores all of the voice templates of callers enrolled in the directory system and is located where most convenient for data transfer with voice servers 32. Preferably, an additional storage unit is also connected to the network for back-up. The digital communication paths 34 between unit 30 and voice servers 32 are indicated by the dashed lines in FIG. 1, and are representative of fast-frame packet data flow. With this preferred arrangement, the exact physical location in the network of template storage unit 30 is not significant from an operational standpoint, but rather the location is chosen for convenient maintenance and servicing, such as at a data control point (DCP).

FIGS. 2A–4B are computer program flow charts illustrating the preferred operation of network 10 for providing personalized, voice-activated, telephone directories to network customers. By way of overview of the preferred embodiment, a customer's personalized directory is configured into a plurality of subdirectories including a personal directory, business directory, company directory and city/state directory. Each subdirectory is further subdivided into a plurality of subsidiary directories some of which are further subdivided into subordinate levels of subsidiary directories.

The lowest level subsidiary directories correspond to the letters of the alphabet and include a plurality of directory listings. The first letter of each listing corresponds to the alphabet letter of the respective subsidiary directory. Each subdirectory and subsidiary directory are identified by a respective name with a corresponding voice template of the customer speaking the name stored in template storage unit 30. Additionally, voice templates are stored of the customer speaking each directory listing. A destination telephone number is stored for retrieval in association with each listing. In this way, the present invention allows inclusion of a large number of directory listings in a manner organized for rapid, voice-activated retrieval and minimal recognition errors. At each stage in the voice recognition process, the system only needs to compare a spoken entry with a limited and thereby rapidly manageable number of voice templates. For example, when a caller is prompted to enter a subdirectory name, the system needs to compare this entry for a match with only four allowable subdirectory names.

In order to create a directory, a customer is enrolled over the network by speaking all of the required entries which are stored as voice templates. In particular, voice templates are created of the customer's password, subdirectory names, subsidiary directory names, and finally the individual directory listings which are usually the names of persons. In addition, the destination telephone number for each listing is entered over the network by depressing the appropriate Dual Tone Multi Frequency DTMF telephone buttons after speaking each listing.

FIGS. 2A–2G illustrate processing subroutine 200 for operating the network and in particular for operating voice servers 32 and template storage unit 30 in order to provide personalized voice-activated telephone directories for network customers. The directories are organized into substantially equal groups of directories, with each group assigned a specific toll-free number for access thereto. By organizing the directories into groups, access time is minimized for retrieving a specific caller's personalized directory, and for verifying the caller's identity.

Subroutine 200 enters at step 202 at which a respective voice server 32 answers a call placed thereto from a caller dialing the toll-free number assigned to the group including the caller's directory. Step 202 voice prompts the caller to provide a spoken entry by saying the caller's identification password, the utterance of which is stored and then compared with previously stored template of the caller speaking the password. In the preferred embodiment, this password is the user's social security number which is first decoded into the individual digits and then used to retrieve the caller's voice template thereof.

Step 204 then asks whether the caller's password has been verified, that is, whether the spoken entry matches the template. If no, the program moves to step 206 which executes a predetermined error subroutine. The preferred error subroutine prompts the user to speak the entry again, and if still not verified or recognized, the caller is transferred to a customer service representative to resolve the problem.

If the answer in step 204 is yes, step 208 then prompts the caller to speak the desired subdirectory name, which entry is then stored and compared to previously stored voice templates of the subdirectory names spoken by the caller during enrollment in the system. Preferably, for system accuracy, this step is speaker dependent, however since a limited number of subdirectory names are used, this may be speaker independent which would provide greater ease of enrollment if the accuracy of recognition is sufficient.

Next, step 210 asks whether the caller's personal directory was selected, that is, whether the entry spoken in step 208 matches the template of the caller speaking "personal directory". This comparison and matching process is repeated for each of the recognition steps discussed hereinbelow. If the answer in step 210 is no, step 212 asks whether the business directory was selected, and if no, step 214 asks whether the company directory was selected. Next, if the answer in step 214 is no, step 216 then asks whether the city/state directory was selected. If the answer to step 216 is no, then the program enters the error routine in step 218, because none of the allowable subdirectory names were recognized as being selected in steps 210-216.

Figure 2A:
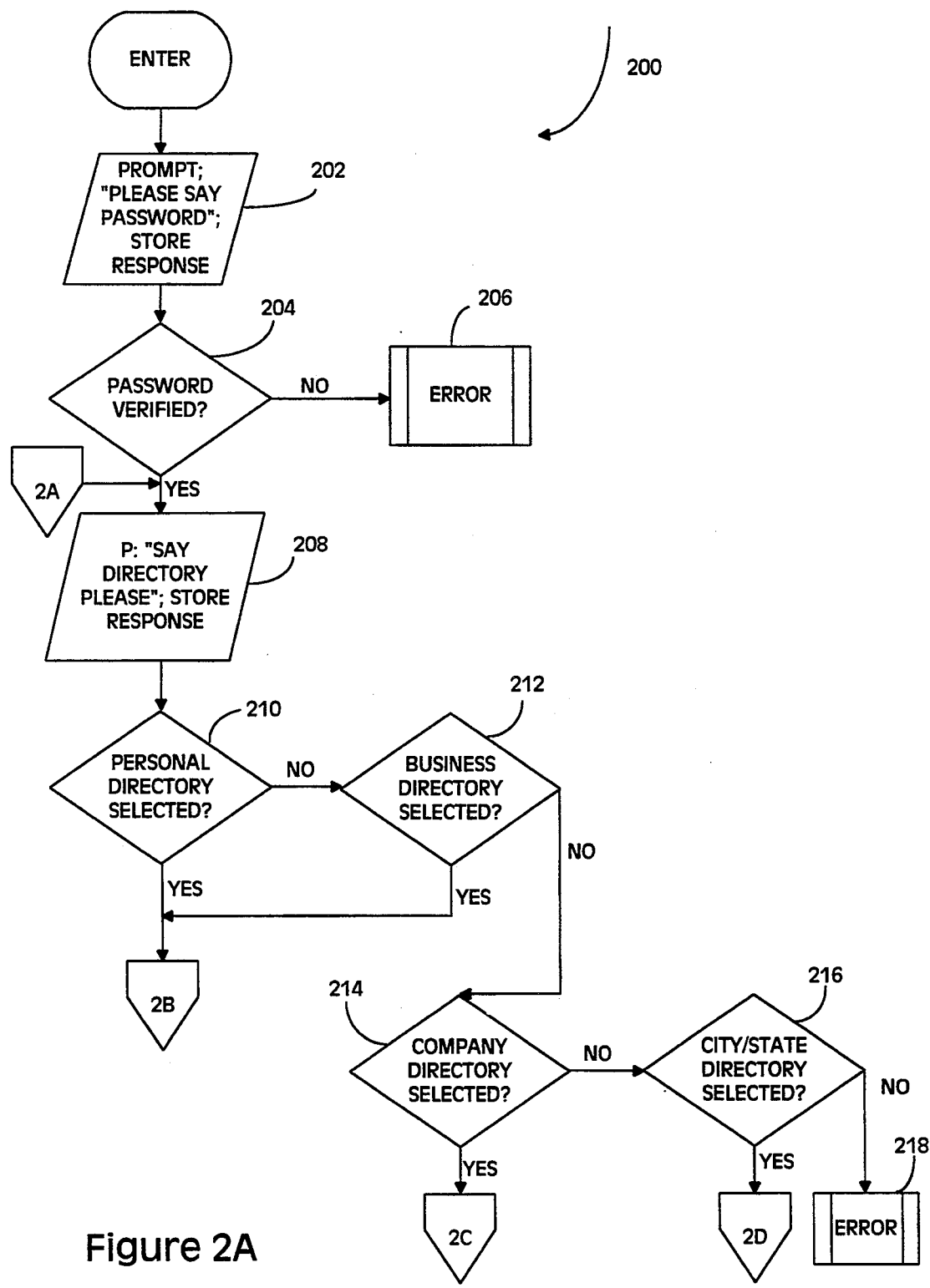
FIG. 2A is a computer program flow chart illustrating one portion of a subroutine for operating the network of FIG. 1 for providing a voice-activated telephone directory.
Figure 2B:
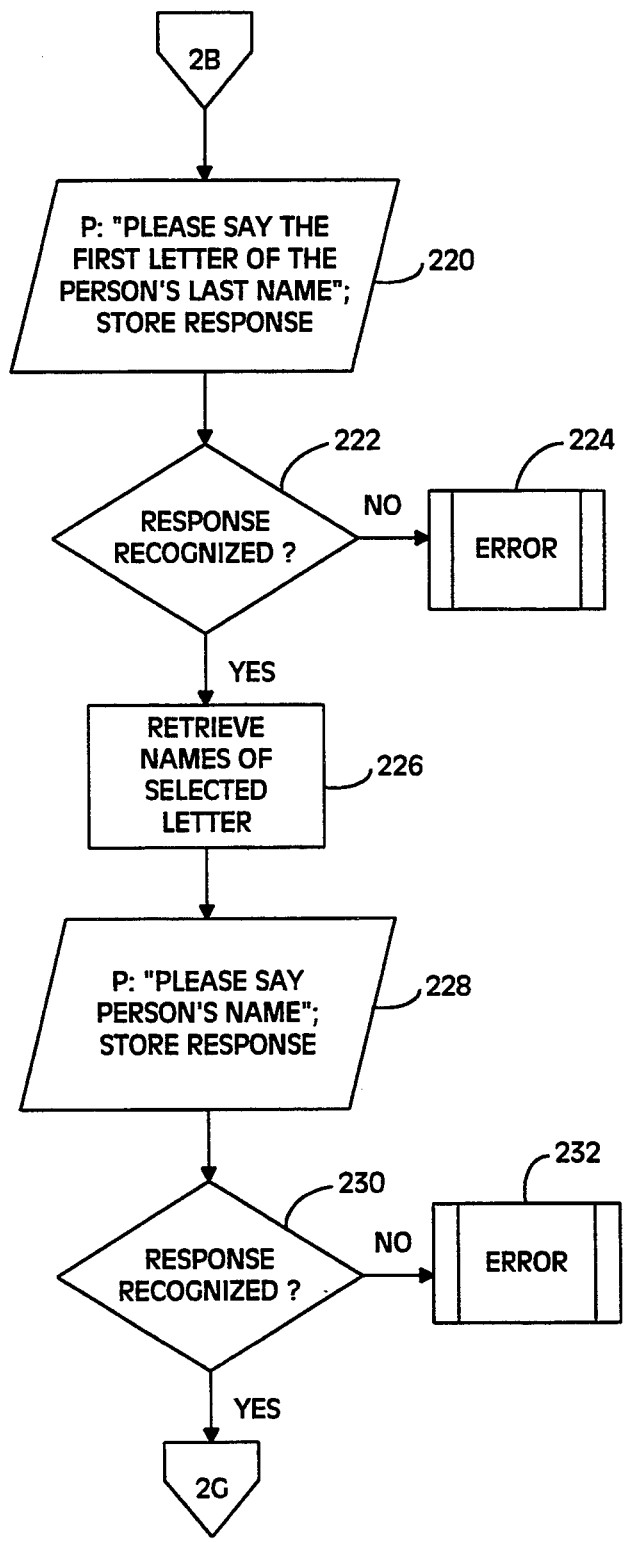
FIG. 2B is a continuation of the flow chart of FIG. 2A.

If the answer in either of steps 210 or 212 is yes, the selected personal or business directory is retrieved and the program moves to step 220, illustrated in FIG. 2B, which prompts the caller to speak the first letter of the name of the person for whom the telephone number is desired. In the preferred embodiment, the first letter of the person's name is spoken in accordance with the international phonetic alphabet such as "alpha", "bravo", "charlie" and so forth. This retrieves the appropriate subsidiary directory corresponding to the selected alphabet letter. By using this technique, errors are minimized in recognizing the caller's spoken entry. Alternatively, the caller may speak letters of the alphabet and since some letters are more difficult to recognize in the case the system is unable to recognize the letter, the system may then ask for the corresponding international phonetic alphabet or other letter representation. It may also be convenient to have the international symbols or other letter representations, pre-printed on the caller's calling card for the ease and the convenience of the caller.

Step 222 then asks whether the response was recognized in step 220. If no, the program enters the error subroutine in step 224. If yes, step 226 retrieves the directory listings included in the subsidiary directory of the alphabet letter spoken in step 220.

Step 228 then prompts the caller to speak the name of the person for whom the destination telephone number is desired. Step 230 then asks whether the spoken entry of step 228 was recognized. If no, the program enters the error routine in step 232. If yes, the program moves to the program portion illustrated in FIG. 2G as explained further hereinbelow.

Referring now to step 214 of FIG. 2A, if the answer in that step was yes, indicating that the caller has selected the company directory, the program moves to step 234, illustrated in FIG. 2D which prompts the caller to say the first letter of the company name using the international phonetic alphabet as discussed in connection with step 220. Step 236 then asks whether the response was recognized. If no, the error routine in step 238 is executed.

If the answer to step 236 is yes, step 240 retrieves the directory listings, that is, the names having the first letter beginning with the letter entered in step 234. Step 242 then prompts the caller to say the desired company name. Step 244 then asks whether the spoken entry of step 242 was recognized. If the answer in step 244 is no indicating that the entry was not recognized, step 246 executes the error routine. If the company name was recognized, the answer in step 244 is yes, then the program moves to the portion illustrated in FIG. 2E.

Figure 2C:
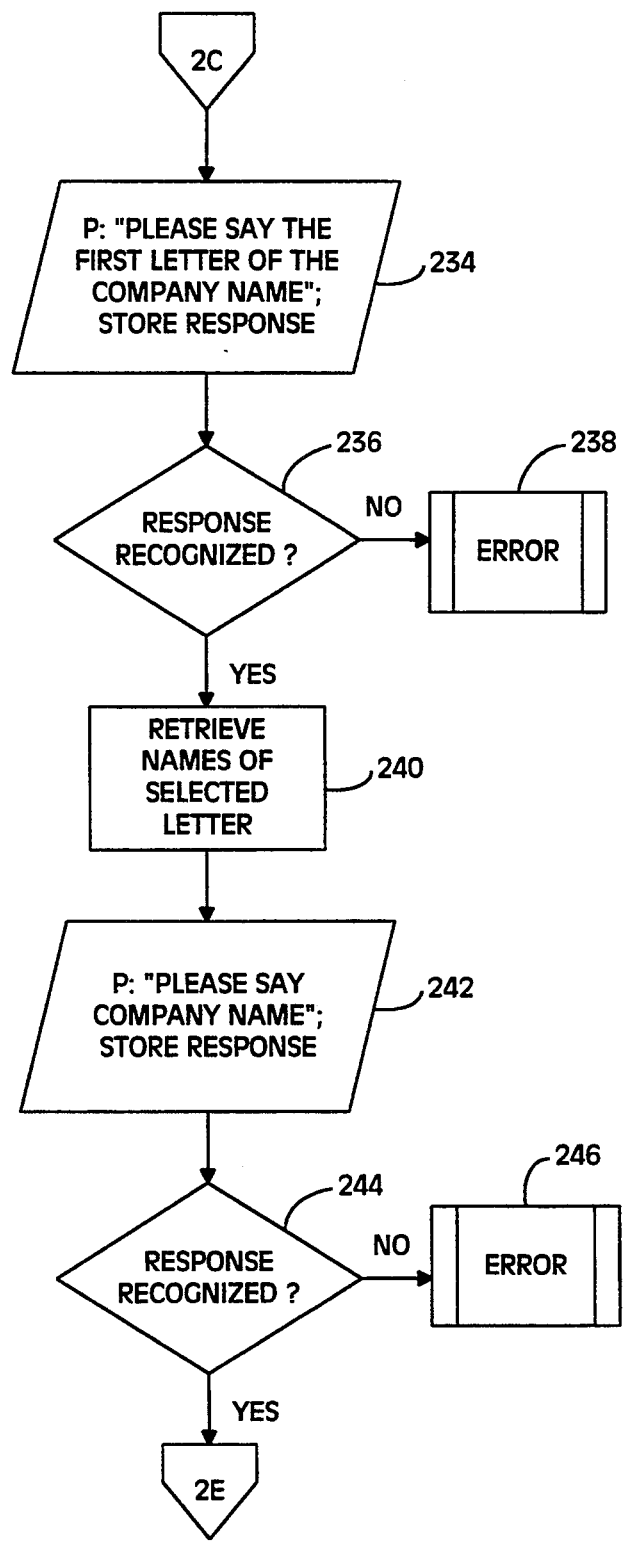
FIG. 2C is a continuation of the flow chart of FIG. 2B.
Figure 2D:
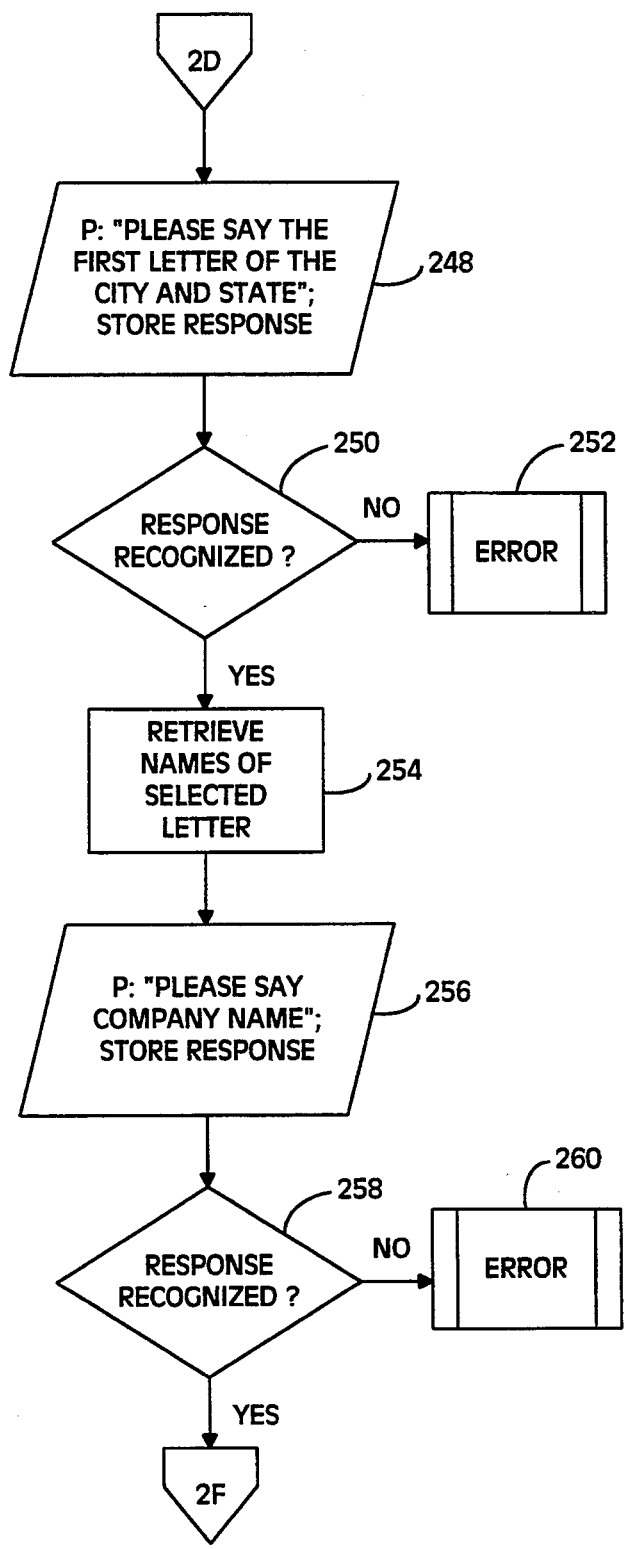
FIG. 2D is a continuation of the flow chart of FIG. 2C.

If the caller selected the city/state directory as indicated by a yes answer to step 216, the program moves to step 248, illustrated in FIG. 2D which prompts the caller to say the first letter of the desired city and state e.g. "alpha" for Anderson, Ind. Step 250 then asks whether the response entered in step 248 has been recognized as one of the allowable responses. If no, step 252 executes the error routine.

If the answer in step 250 is yes, step 254 retrieves the city/state names having the first letter corresponding to the entered letter. Step 256 then prompts the caller to speak the desired city and state. If this response is not recognized as tested in step 258, the program moves to execute the error routine in step 260. If the answer in step 258 is yes, the program moves to the program portion illustrated in FIG. 2F.

Figure 2E:
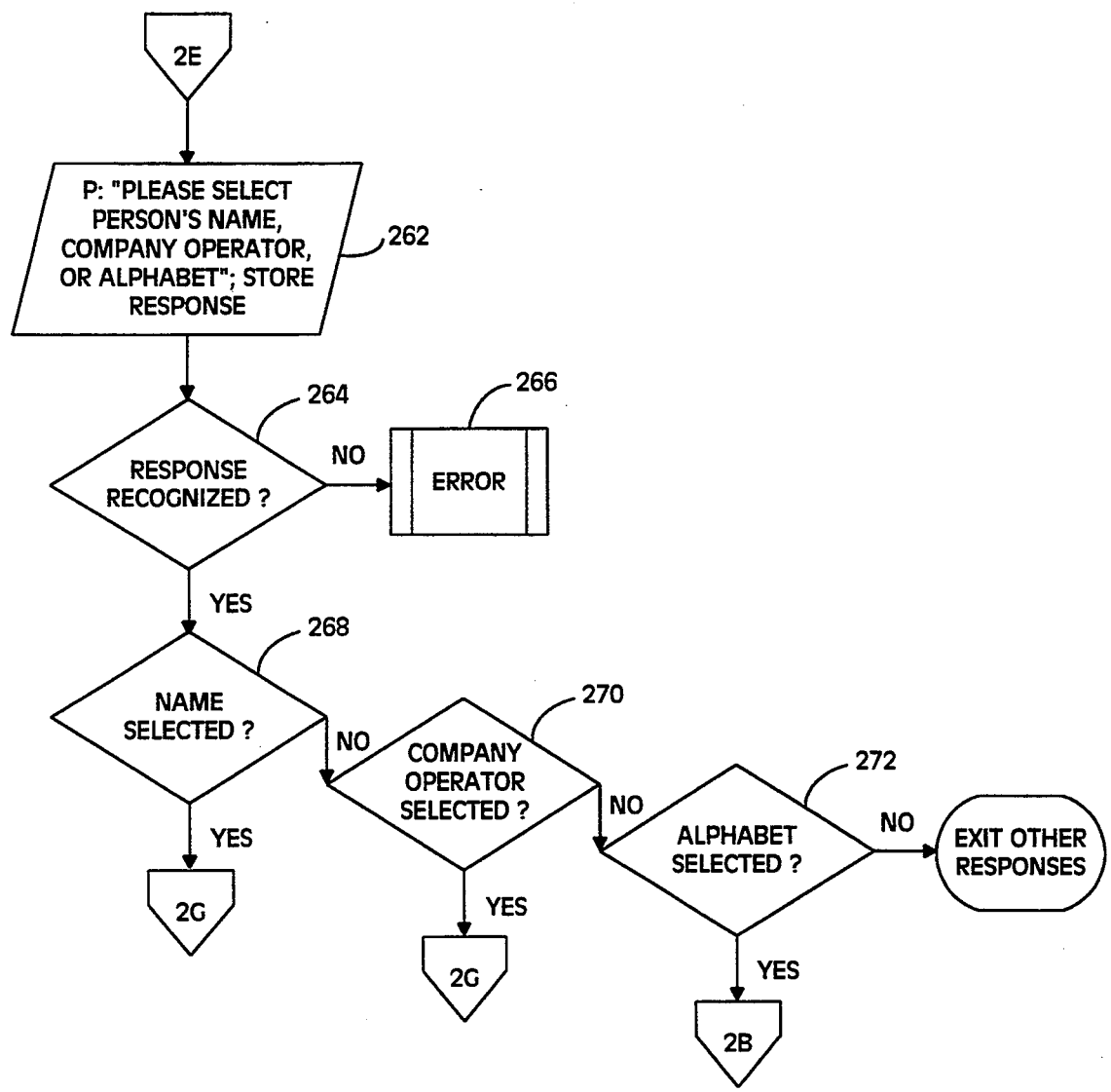
FIG. 2E is a continuation of the flow chart of FIG. 2C.
Figure 2F:
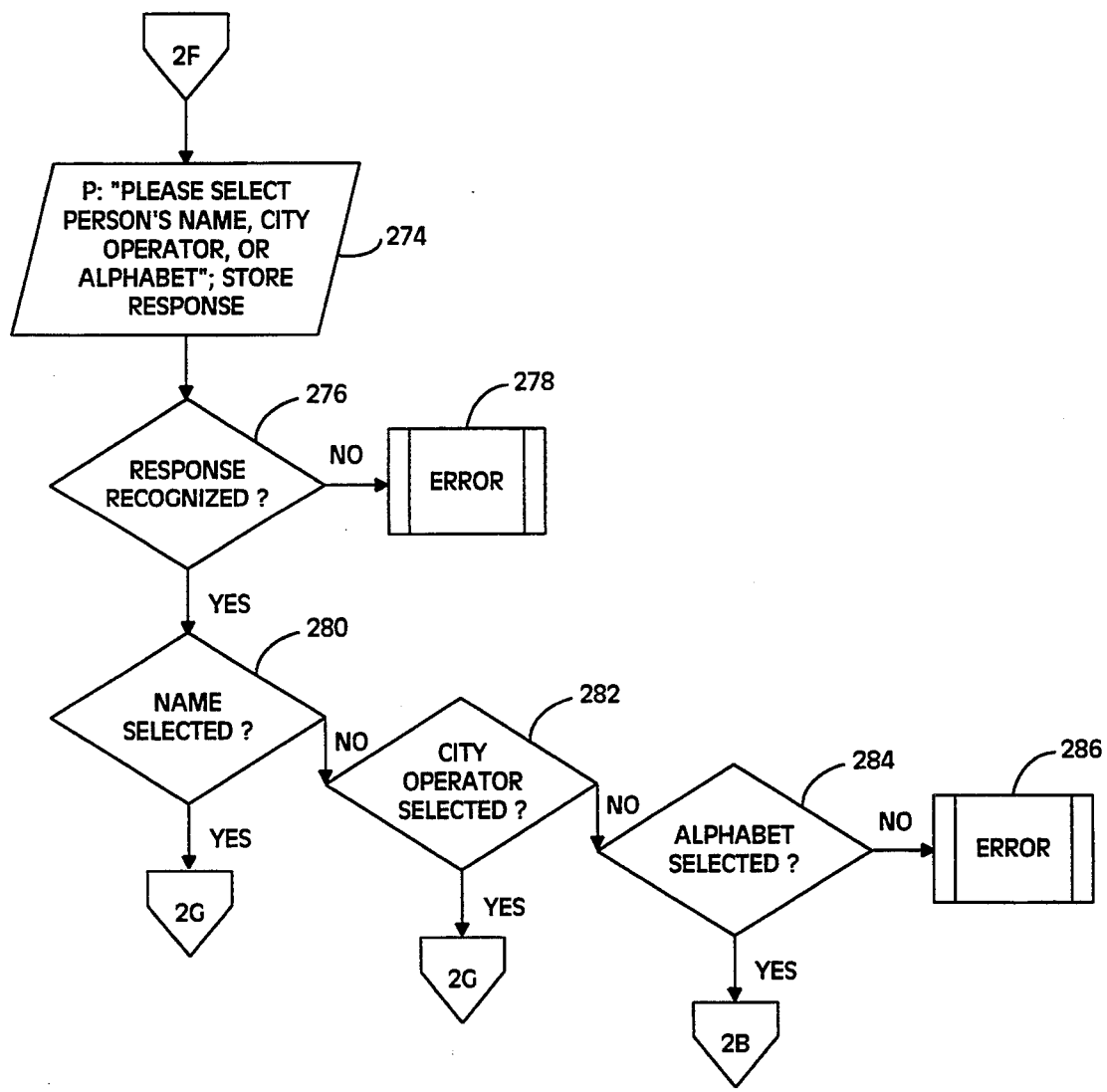
FIG. 2F is a continuation of the flow chart of FIG. 2D.

Turning now to FIG. 2E, if the answer in step 244 of FIG. 2C is yes, indicating that the caller's spoken entry was recognized as an allowable company name, the program moves to step 262 which prompts the caller to say a person's name, company operator or alphabet. Step 264 then asks whether the caller's response is recognized. If no, step 266 executes the error routine.

If the answer in step 264 is yes, step 268 asks whether the caller selected a person's name. If yes, the program moves to the program portion illustrated in FIG. 2G as discussed further hereinbelow. If the answer in step 268 is no, step 270 asks whether the caller entered a request for the company operator. If yes, the program moves to retrieve the company operator number as discussed further in connection with FIG. 2G.

If the company operator was not selected in step 270, step 272 then asks whether the alphabet was selected. If yes, the program loops back to step 220 (FIG. 2B) to conduct the alphabet steps as discussed above. If the answer to step 272 is no, the program exits. The program portion illustrated in FIG. 2F enters at step 274 if the answer in step 258 (FIG. 2D) is yes. Step 274 prompts the caller to select a person's name, city operator, or alphabet. Step 276 then asks whether the caller's response was recognized. If no, step 278 executes the error routine.

If the response is recognized in step 276, step 280 then asks whether a name was selected. If yes, the program moves to the portion illustrated in FIG. 2G. If the caller has stored relatively few names in the city/state subdirectory, then it is not necessary to form a subsidiary directory of names by alphabet. Thus, if this is the case, a yes answer in step 280 allows the program to move to the portion illustrated in FIG. 2G.

Figure 2G:
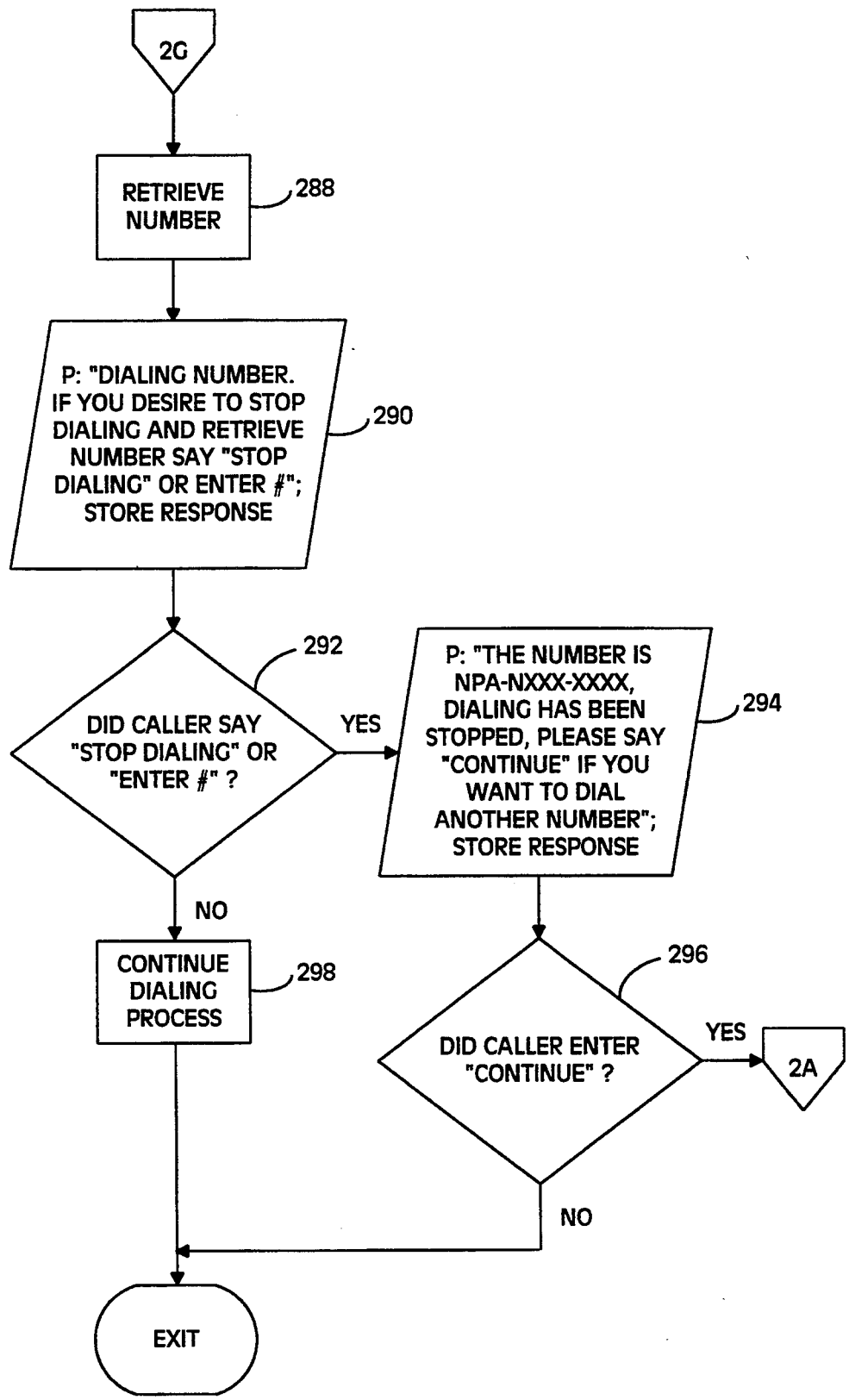
FIG. 2G is a continuation of the flow chart of FIG. 2B.

Step 282 asks whether the caller selected the city operator and if yes, the program moves to the portion illustrated in FIG. 2G. If the answer in step 282 is no, step 284 asks whether the caller selected the alphabet. If yes, the program loops back to step 220 (FIG. 2B). If no, then an error is indicated and step 286 executes the error routine.

After steps 230 (FIG. 2B), 268 or 270 (FIG. 2E), or steps 280 or 282 (FIG. 2F), the program moves to the program portion illustrated in FIG. 2G and enters at step 288. This step retrieves the destination telephone number stored in association with the directory listing finally selected by the caller, and initiates dialing of the number. In the preferred embodiment the number of allowable listings for any one subsidiary directory is limited to eight in order to minimize processing time. This allows 208 entries (eight for each letter of the alphabet) for each subdirectory and a total of 832 entries (208 for each of the four subdirectories).

As those skilled in the art appreciate, the dialing process is initiated by retrieving the number from memory and transferring it to the switch at which the call originated. The program then moves to step 290 which prompts the caller to indicate whether the caller wishes dialing of the number to stop by either saying "stop dialing" or by depressing the # button or some other DTMF digits on a DTMF telephone.

Step 292 then asks whether the caller wishes to stop the dialing of the number. If yes, the system voice prompt in step 294 says the number so that the caller can write it down if desired. Step 294 also prompts the caller to say "continue" if the caller wishes to retrieve another entry in the directory. The program then moves to step 296 which asks if the caller wishes to continue with another directory entry, and if yes, the program loops back to step 208 (FIG. 2A).

If the answer in step 292 is no, the dialing of the destination telephone continues to completion in step 298. The program then exits.

Figure 3:
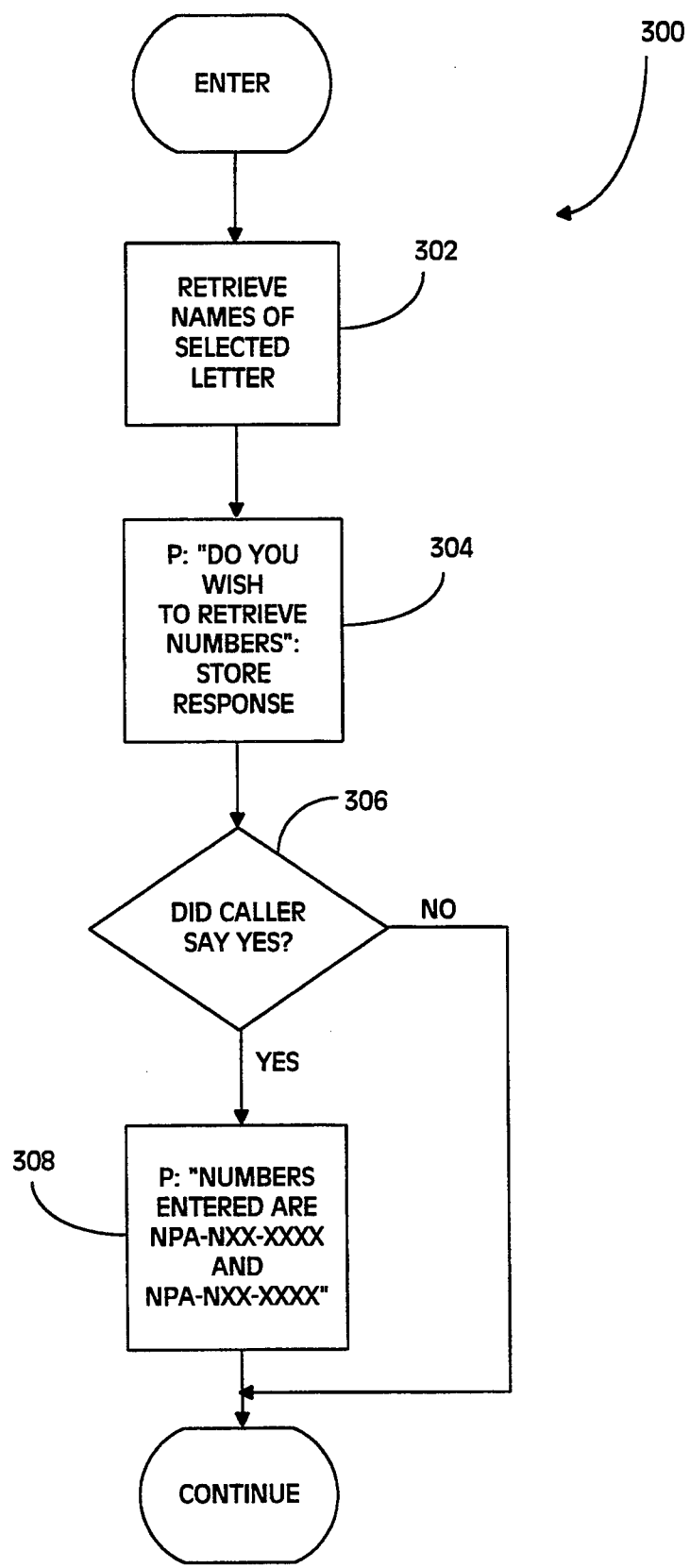
FIG. 3 is a computer program flow chart illustrating a modification of the flow charts of FIGS. 2A-G as another embodiment.

FIG. 3 is a computer program flow chart illustrating a portion of another embodiment 300 of the directory system hereof. More particularly, portion 300 can replace step 226 (FIG. 2B) for example, to allow the caller to hear a listing of all of the telephone numbers in association with the directory listing names. Program portion 300 enters at step 302 which retrieves the names in the subsidiary directory corresponding to the alphabet letter selected in step 220 (FIG. 2B). Step 304 then voice prompts the caller to indicate whether the caller wishes the destination telephone numbers to be retrieved. Next, step 306 asks whether the caller responded with a yes answer. If yes, step 308 provides a voice response of all of the associated telephone numbers. If the answer in step 306 is no, or after step 308, the program continues on to step 228.

Figure 4A:
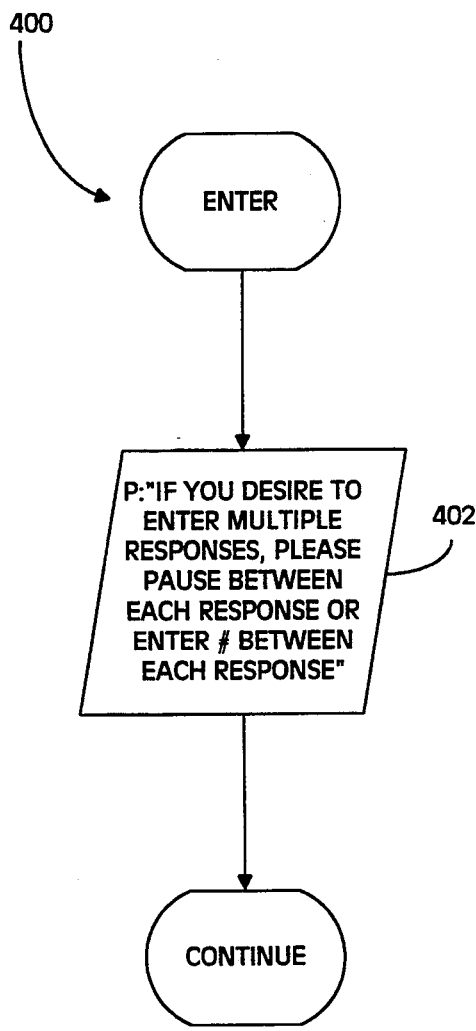
FIG. 4A is a portion of a computer program flow chart illustrating an additional modification of the flow charts FIGS. 2A-G as a further embodiment.
Figure 4B:
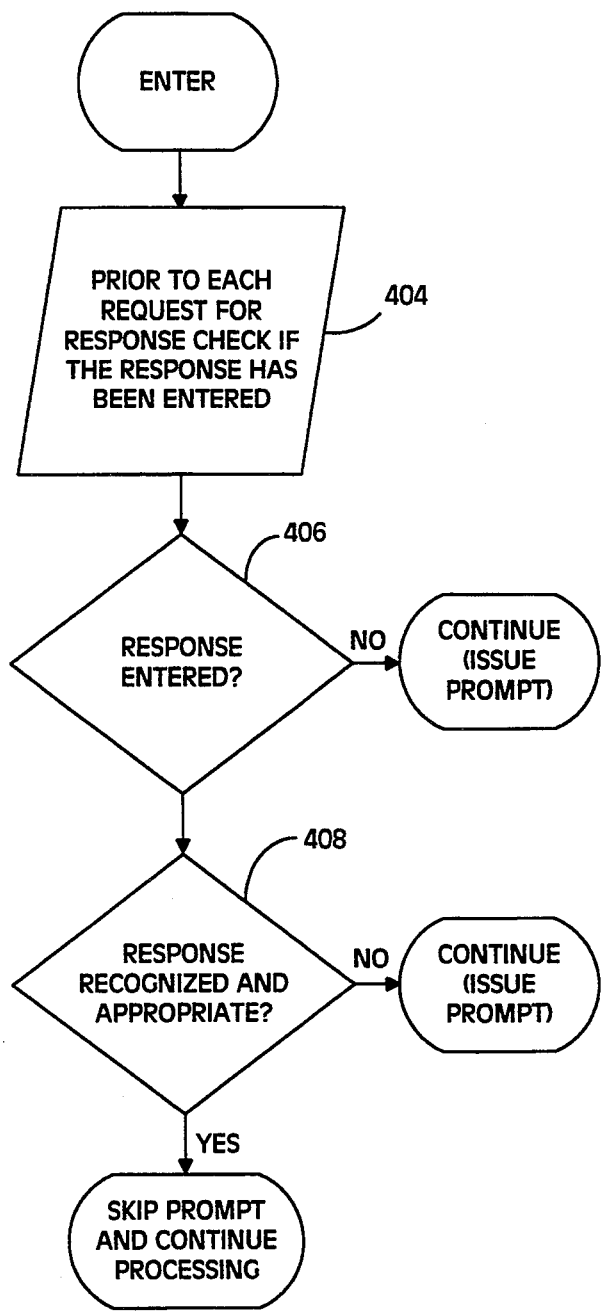
FIG. 4B is an additional portion of the flow chart of FIG. 4A.

FIGS. 4A and 4B are computer program flow charts illustrating another modified embodiment 400. This embodiment allows an experienced user of the directory system hereof to enter all of the required spoken entries in one step. The program stores these entries and then retrieves them in sequence at the proper steps in the program in order to retrieve the desired destination telephone number. This eliminates the need for an experienced user to wait for the various voice prompts, and thereby speeds the operation.

Referring initially to FIG. 4A, the voice prompt indicated in step 402 is added to step 208 (FIG. 2A). If the caller desires to use this feature, each of the entries is spoken with a pause between each entry or by depressing the # DTMF button as a cue. For example, the caller could enter "personal", "alpha", and "John Anderson" as three sequential spoken entries. These entries are then stored and retrieved in sequence according to steps of FIG. 4B. More particularly, the steps shown in FIG. 4B are added to subroutine 200 before each voice prompt for a caller response such as, before steps 220, 234 and 248, for example.

In step 404, the program checks to see if a corresponding caller entry has already been stored. Step 406 then asks whether such a response has been stored. If no, the program moves to execute the appropriate prompt to the caller. If an entry has been stored, step 408 asks whether the response is recognized as one of the allowable responses at that particular step in the program. If no, the program again moves to execute the appropriate prompt. If the response has been recognized, the prompt and corresponding recognition steps are skipped. In this way, the directory utilization process can proceed much faster by eliminating the time needed to provide the voice prompt and the pause time needed for the caller entry. As those skilled in the art will appreciate, the present invention encompasses many variations in the preferred embodiments described herein without departing from the scope and spirit of the invention as claimed herein. For example, the preferred terms directory, subdirectory, subsidiary directory and subordinate directory are used herein for clarity in order to illustrate the preferred embodiment having succeeding levels of directories. Other terms can be used equivalently.

Having thus described the preferred embodiments of the present invention, the following is claimed as new and desired to be secured by Letters Patent:

I claim:

1. A method of operating a telecommunications network for providing a voice-activated telephone directory, the network having the capability of routing calls thereover and for processing caller-spoken, voice entries, said method comprising the steps of:
    (a) storing a plurality of caller-associated telephone directories including the step of storing voice templates of a plurality of callers speaking respective directory listings;
    (b) organizing said listings as part of respective subsidiary directories having respective subsidiary directory names with said subsidiary directories included as part of respective subdirectories having respective subdirectory names;
    (c) storing voice templates of the callers speaking said respective subdirectory and subsidiary directory names;
    (d) receiving a telephone call over the network from a caller in response to the dialing of a directory access telephone number associated with the caller's directory;
    (e) verifying the identity of the caller and, in response, retrieving said directory associated with the caller;
    (f) receiving a caller-spoken entry, comparing said entry with said subdirectory name template of said directory associated with the caller, and determining whether said entry matches said subdirectory name template;
    (g) if a match is determined between said entry and subdirectory name template, comparing a subsequent caller-spoken entry with said subsidiary directory name template included as part of said subdirectory, and determining whether said subsequent entry matches said subsidiary directory name template;
    (h) if a match is determined between said subsequent entry and subsidiary directory name template, comparing an additional caller-spoken entry with said listing template, and determining whether said additional entry matches said listing template; and
    (i) if a match is determined between said additional entry and listing template, retrieving said listing-associated telephone number.

2. The method as set forth in claim 1, said verifying step including the steps of receiving a caller-spoken entry of the passcode, comparing said entry with a previously stored voice template of the caller speaking a passcode, determining whether said passcode entry matches said passcode template.

3. The method as set forth in claim 2, said verifying step including the steps of using the caller's social security number as said passcode and decoding said passcode entry independently of the speaker thereof in order to retrieve said passcode template.

4. The method as set forth in claim 1, further including the steps of storing a plurality of directories organized into a plurality of groups, assigning a directory access telephone number to each of said groups, and providing access to a directory included in one of said groups in response to the dialing of said directory access telephone number assigned thereto.

5. The method as set forth in claim 1, further including the step of naming said subsidiary directories as the letter of the alphabet corresponding to the first letter of the respective listing included in said subsidiary directories.

6. The method as set forth in claim 1, further including the step of identifying said subdirectory as a specific type of subdirectory.

7. The method as set forth in claim 6, said specific type of subdirectory including one of a personal directory, business directory, company directory, and city-/state directory.

8. The method as set forth in claim 1, further including the steps of providing voice prompts over the network to the caller in order to prompt the caller to speak said entries.

9. The method as set forth in claim 1, further including the step of providing a voice rendition of said telephone number to the caller.

10. A method of operating a telecommunications network for providing a voice-activated telephone directory, said network having a capability of routing calls thereover and for processing caller-spoken, voice entries, said method comprising the steps of:
  (a) storing a plurality of subdirectories organized into a plurality of directories;
  (b) assigning a predetermined telephone number to each of said directories;
  (c) providing access to a directory in response to a caller dialing said telephone number assigned to said directory;
  (d) comparing a caller-spoken entry received over said network with a previously stored voice template of said caller speaking a subdirectory name identifying a subdirectory included as part of said directory associated with said telephone number, and determining whether said spoken entry matches said subdirectory name template;
  (e) if a match is determined between said entry and name template, comparing a subsequent, caller-spoken entry received over said network with a previously stored, voice template of said caller speaking a directory listing organized as part of said subdirectory, and determining whether said subsequent entry matches said directory listing template; and
  (f) if a match is determined between said subsequent entry and said directory listing template, retrieving a destination telephone number previously stored in association with said directory listing.

* * * * *